(12) United States Patent
Meng et al.

(10) Patent No.: US 10,767,060 B2
(45) Date of Patent: Sep. 8, 2020

(54) ULTRA-STABLE PRINTING AND COATINGS USING AQUEOUS COMPLEX COACERVATES, AND COMPOSITIONS AND METHODS THEREOF

(71) Applicant: University of Massachusetts, Boston, MA (US)

(72) Inventors: Xiangxi Meng, Sunderland, MA (US); Sarah L. Perry, Belchertown, MA (US); Jessica D. Schiffman, Amherst, MA (US)

(73) Assignee: University of Massachusetts, Boston, MA (US)

( * ) Notice: Subject to any disclaimer, the term of this patent is extended or adjusted under 35 U.S.C. 154(b) by 238 days.

(21) Appl. No.: 15/985,855

(22) Filed: May 22, 2018

(65) Prior Publication Data

US 2018/0334581 A1 Nov. 22, 2018

Related U.S. Application Data

(60) Provisional application No. 62/509,210, filed on May 22, 2017.

(51) Int. Cl.
*C09K 3/00* (2006.01)
*C09D 11/023* (2014.01)
*C09D 11/08* (2006.01)
*C09D 11/10* (2014.01)
*C09D 11/38* (2014.01)
*C09D 11/03* (2014.01)
*C09D 1/00* (2006.01)
*C09D 4/00* (2006.01)
*C09D 5/00* (2006.01)
*C09D 11/00* (2014.01)

(52) U.S. Cl.
CPC ............ *C09D 11/023* (2013.01); *C09D 11/03* (2013.01); *C09D 11/08* (2013.01); *C09D 11/10* (2013.01); *C09D 11/38* (2013.01)

(58) Field of Classification Search
USPC ................................. 106/31.01, 31.13, 31.25
See application file for complete search history.

(56) References Cited

U.S. PATENT DOCUMENTS

2001/0008874 A1* 7/2001 Igari ...................... A01N 47/22
504/359
2017/0157285 A1* 6/2017 Stewart .............. A61K 49/0043

* cited by examiner

*Primary Examiner* — James E McDonough
(74) *Attorney, Agent, or Firm* — Milstein Zhang & Wu LLC (57) ABSTRACT

The invention provides compositions and methods for ultra-stable coating or printing from aqueous complex coacervates.

20 Claims, 6 Drawing Sheets

ULTRA-STABLE PRINTING AND COATINGS USING AQUEOUS COMPLEX COACERVATES, AND COMPOSITIONS AND METHODS THEREOF

PRIORITY CLAIMS AND RELATED PATENT APPLICATIONS

This application claims the benefit of priority to U.S. Provisional Application Ser. No. 62/509,210, filed on May 22, 2017, the entire content of which is incorporated herein by reference.

TECHNICAL FIELDS OF THE INVENTION

The invention generally relates to nano- and macro-scale materials based on polyelectrolyte complexes and their use in coating and/or printing and related applications. More particularly, the invention relates to ultra-stable coatings and/or prints prepared from aqueous complex coacervates, and compositions and methods thereof.

BACKGROUND OF THE INVENTION

Over the past decades, significant advances have been made in novel printing materials and systems. For example, inkjet printing has been a key technology in the field of defined polymer deposition. 3D printing techniques of polymer composite materials have also gained attention in recent years for their potential use in biomedical, electronics and aerospace engineering.

Existing printing technologies using inks containing polymers and pigments require the use of organic solvents. Given the drawbacks of organic solvents in processing complexities, cost increases, and their negative impact on the environment, "green inks" devoid of toxic organic solvents are desired to enable applications in personalized health care monitoring, food packaging, coatings, 3D printing, and drug delivery. Unfortunately, a major challenge in the green processing of polymers is their poor solubility in water.

Thus, major obstacles remain in providing cost effective and environmentally friendly printing methodologies.

SUMMARY OF THE INVENTION

The invention provides ultra-stable coatings and/or prints prepared from aqueous complex coacervates, and compositions and methods thereof. The printed materials and methods disclosed herein can be used in a wide-range of applications, for example, packaging and labeling strategies, sensing, water purification, tissue engineering, personalized health care, home use, wound dressing, drug delivery, and device manufacturing.

In one aspect, the invention generally relates to a method for forming a coating on a substrate. The method includes: providing an aqueous coacervate suspension comprising a polyanion or macroanion, a polycation or macrocation, and a salt; coalescing the aqueous coacervate suspension into a homogeneous coacervate phase; and depositing the coacervate phase on a substrate to form a coating on the substrate.

In another aspect, the invention generally relates to a coating formed by a method disclosed herein.

In yet another aspect, the invention generally relates to a method for printing from an aqueous coacervate composition. The method includes: providing an aqueous coacervate suspension comprising a polyanion or macroanion, a polycation or macrocation, and a salt; coalescing the aqueous coacervate suspension into a homogeneous coacervate phase; and depositing the coacervate phase on a substrate to form a print on the substrate.

In yet another aspect, the invention generally relates to a print formed by a method disclosed herein.

In yet another aspect, the invention generally relates to an aqueous ink, comprising a polyanion or macroanion, a polycation or macrocation, and a salt.

DETAILED DESCRIPTION OF THE INVENTION

The invention provides a revolutionary approach to printing with an "ink" that is based on a class of polymer-rich liquids, termed complex coacervates.

The majority of water-soluble polymers are charged polyelectrolytes. However, due to the repulsive forces between like charges along the polymer chains, polyelectrolyte solutions suffer from significantly higher viscosities than neutral polymer solutions at the same polymer concentration. This leads to difficulties in processing the subsequent solutions. Furthermore, simple solutions of water-soluble polymers require crosslinking or additional post-processing in order to create a chemically robust material. Organic solvents and crosslinking agents can have serious cytotoxicity concerns that limit the utility of such materials.

The invention signifies a new platform technology for liquid-to-solid transition. Such transition is achievable using purely aqueous processing strategies without the need for any organic solvents. Thus, the invention represents a uniquely enabling technology for much desired green printing.

The use of complex coacervation as a key material for green printing affords an inexpensive and environment-friendly approach that utilizes commercially available, water-soluble, charged polymers as ultra-stable ink formulations.

Complex coacervates are dense, polyelectrolyte-rich liquids that result from the electrostatic complexation of oppositely charged polymers or other macro-ions in water. Their self-assembly is driven by both electrostatics and entropy. Furthermore, the low surface tension of coacervates with water has facilitated their use as encapsulants in the food and personal care industries, for drug and gene delivery, and as underwater adhesives.

Recent literature reports have demonstrated that decreasing amounts of salt can be used to plasticize liquid coacervates and enable a transition from a processable liquid state to a solid product. The fully aqueous nature of coacervate-based materials circumvents the need for purification or post-processing to remove toxic organic solvents, while the strong electrostatic interactions driving the self-assembly of these materials results in exceptionally stable and solvent resistant solid polyelectrolyte complexes.

Methods for controlled fine-tuning of the liquid-to-solid transition process are urgently needed. In addition to adjusting the relative concentration of the charged polymers, polymer chain length, chemistry of the charged species, ionic strength, and solution pH, it is disclosed herein that adjusting the salt concentration appropriately is key to using the new class of coacervate-based ultra-stable materials for applications in printing.

For example, salt concentration can be employed to drive the solidification of these materials for the creation of solid-state materials from these polymer-rich liquids.

Figure 1:
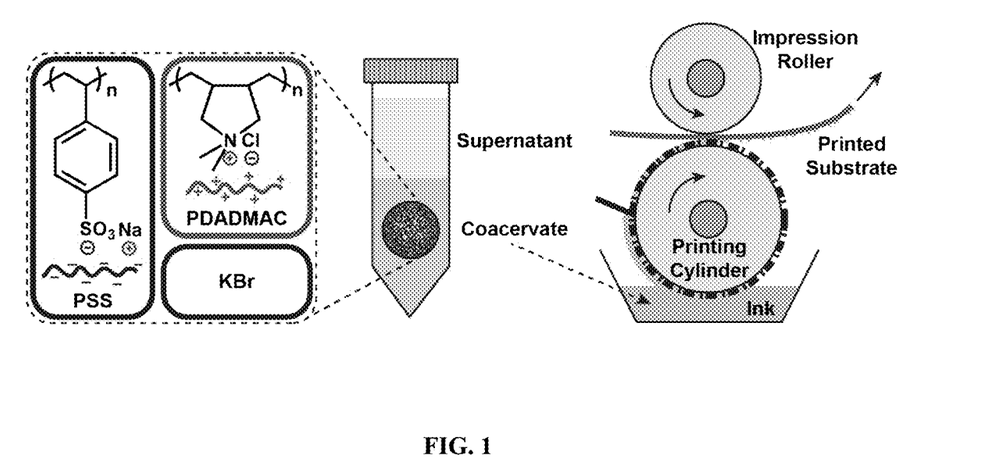
FIG. 1. Schematic illustration of printing and coating with chemically robust coacervate-based inks.

FIG. 1 schematically depicts of a gravure-based coating or printing method utilizing aqueous complex coacervate compositions. The aqueous complex coacervate compositions and the process can be readily adapted for other coating or printing methods, such as inkjet printing or screen printing. An inkjet printing typically involves propelling ink droplets onto a substrate and may adopt a continuous or drop-on-demand approach. An example of screen printing is the use of a pre-designed mesh to transfer ink onto a substrate and certain areas can be made impermeable to the ink by a blocking stencil to control the pattern of the print or coating.

In one aspect, the invention generally relates to a method for forming a coating on a substrate. The method includes: providing an aqueous coacervate suspension comprising a polyanion or macroanion, a polycation or macrocation, and a salt; coalescing the aqueous coacervate suspension into a homogeneous coacervate phase; and depositing the coacervate phase on a substrate to form a coating on the substrate.

In certain embodiments, the aqueous coacervate suspension includes no organic solvent or co-solvent.

In certain embodiments, the aqueous coacervate suspension comprises no crosslinking agent.

In certain embodiments, the stoichiometry of polyanion or macroanion to polycation or macrocation in the aqueous coacervate suspension is from about 3:7 to about 7:3 (e.g., from about 3:6 to about 6:3, from about 3:5 to about 5:3, from about 3:4 to about 4:3, about 1:1).

In certain embodiments, the stoichiometry of polyanion or macroanion to polycation or macrocation in the aqueous coacervate suspension is from about 0.25 to about 0.75 (e.g., from about 0.35 to about 0.75, from about 0.50 to about 0.75, from about 0.60 to about 0.75, from about 0.25 to about 0.60, from about 0.25 to about 0.50, from about 0.25 to about 0.40, from about 0.35 to about 0.65, from about 0.4 to about 0.6, about 0.25, about 0.5, about 0.75).

It is noted that the substrate on which a print or coating may be formed according the processes disclosed here can be of any suitable material, for example, paper, plastic, fabric, metallic or inorganic materials.

In certain embodiments, the substrate is conventional paper or cardboard.

In certain embodiments, the substrate is a plastic, fabric, metallic or inorganic material.

In certain embodiments, the polycation or macrocation is a peptide or protein, a polysaccharide, a polymer, a nanoparticle, or a charged surfactant molecule or micelle.

In certain embodiments, the polyanion or macroanion is a peptide or protein, a polysaccharide, a polymer, a nucleic acid, a nanoparticle, or a charged surfactant molecule or micelle.

In certain embodiments, the polycation or macrocation is selected from poly(diallyldimethyl ammonium), chitosan and poly(allylamine hydrochloride).

In certain embodiments, the polyanion or macroanion is selected from poly(styrene sulfonate), hyaluronic acid, poly (acrylic acid), poly(galacturonic acid) and alginate.

In certain embodiments, the salt is selected from NaCl, KCl, LiCl, NaBr, KBr, LiBr, NaI, KI, LiI, $Na_2SO_4$, $NaNO_3$, $CaCl_2$, $MgCl_2$, $MgSO_4$, ammonium formate, as well as transition metal salts, lanthanides, and actinides.

In certain embodiments, the polycation or macrocation comprises poly(diallyldimethyl ammonium), the polyanion or macroanion comprises poly(styrene sulfonate), and the salt comprises KBr.

In certain embodiments, the polycation or macrocation and polyanion or macroanion are of substantially equal length.

In certain embodiments, the polycation or macrocation and polyanion or macroanion are of substantially different length.

In another aspect, the invention generally relates to a coating formed by a method disclosed herein.

In certain embodiments, the coating of the invention has a substantially uniform thickness. In certain embodiments, the substantially uniform thickness is in the range from 5 nm to about 500 µm (e.g., from 10 nm to about 500 µm, from 100 nm to about 500 µm, from 1 µm to about 500 µm, from 10 µm to about 500 µm, from 100 µm to about 500 µm, from 5 nm to about 100 µm, from 5 nm to about 10 µm, from 5 nm to about 1 µm, from 5 nm to about 500 nm, from 5 nm to about 100 nm, from 10 nm to about 1 µm, from 10 nm to about 500 nm, from 10 nm to about 200 nm, from 20 nm to about 100 nm).

In yet another aspect, the invention generally relates to a method for printing from an aqueous coacervate composition. The method includes: providing an aqueous coacervate suspension comprising a polyanion or macroanion, a polycation or macrocation, and a salt; coalescing the aqueous coacervate suspension into a homogeneous coacervate phase; and depositing the coacervate phase on a substrate to form a print on the substrate.

In certain embodiments, the aqueous coacervate suspension comprises no organic solvent or co-solvent.

In certain embodiments, the aqueous coacervate suspension comprises no crosslinking agent.

In certain embodiments, the stoichiometry of polyanion or macroanion to polycation or macrocation in the aqueous coacervate suspension is from about 3:7 to about 7:3 (e.g., from about 3:6 to about 6:3, from about 3:5 to about 5:3, from about 3:4 to about 4:3, about 1:1).

In certain embodiments, the stoichiometry of polyanion or macroanion to polycation or macrocation in the aqueous coacervate suspension is from about 0.25 to about 0.75 (e.g., from about 0.35 to about 0.75, from about 0.50 to about 0.75, from about 0.60 to about 0.75, from about 0.25 to about 0.60, from about 0.25 to about 0.50, from about 0.25 to about 0.40, from about 0.35 to about 0.65, from about 0.4 to about 0.6, about 0.25, about 0.5, about 0.75).

In certain embodiments, the substrate is conventional paper or cardboard.

In certain embodiments, the substrate is a plastic, fabric, metallic or inorganic material.

In certain embodiments, the polycation or macrocation is a peptide or protein, a polysaccharide, a polymer, a nanoparticle, or a charged surfactant molecule or micelle.

In certain embodiments, the polyanion or macroanion is a peptide or protein, a polysaccharide, a polymer, a nucleic acid, a nanoparticle, or a charged surfactant molecule or micelle.

In certain embodiments, the polycation or macrocation is selected from poly(diallyldimethyl ammonium), chitosan and poly(allylamine hydrochloride).

In certain embodiments, the polyanion or macroanion is selected from poly(styrene sulfonate), hyaluronic acid, poly (acrylic acid), poly(galacturonic acid) and alginate.

In certain embodiments, the salt is selected from NaCl, KCl, LiCl, NaBr, KBr, LiBr, NaI, KI, LiI, $Na_2SO_4$, $NaNO_3$, $CaCl_2$, $MgCl_2$, $MgSO_4$, ammonium formate, as well as transition metal salts, lanthanides, and actinides.

In certain embodiments, the polycation or macrocation comprises poly(diallyldimethyl ammonium), the polyanion or macroanion comprises poly(styrene sulfonate), and the salt comprises KBr.

In certain embodiments, the polycation or macrocation and polyanion or macroanion are substantially of equal length.

In certain embodiments, the polycation or macrocation and polyanion or macroanion are substantially of different lengths.

In yet another aspect, the invention generally relates to a print formed by a method disclosed herein.

In yet another aspect, the invention generally relates to an aqueous ink, comprising a polyanion or macroanion, a polycation or macrocation, and a salt.

In certain embodiments, the aqueous ink comprises no organic solvent or co-solvent.

In certain embodiments, the aqueous ink comprises no crosslinking agent.

In certain embodiments, the stoichiometry of polyanion or macroanion to polycation or macrocation in the aqueous coacervate suspension is from about 3:7 to about 7:3 (e.g., from about 3:6 to about 6:3, from about 3:5 to about 5:3, from about 3:4 to about 4:3, about 1:1).

In certain embodiments, the stoichiometry of polyanion or macroanion to polycation or macrocation in the aqueous coacervate suspension is from about 0.25 to about 0.75 (e.g., from about 0.35 to about 0.75, from about 0.50 to about 0.75, from about 0.60 to about 0.75, from about 0.25 to about 0.60, from about 0.25 to about 0.50, from about 0.25 to about 0.40, from about 0.35 to about 0.65, from about 0.4 to about 0.6, about 0.25, about 0.5, about 0.75).

In certain embodiments, the aqueous ink is suitable for printing on conventional paper or cardboard.

In certain embodiments, the polycation or macrocation is a peptide or protein, a polysaccharide, a polymer, a nanoparticle, or a charged surfactant molecule or micelle.

In certain embodiments, the polyanion or macroanion is a peptide or protein, a polysaccharide, a polymer, a nucleic acid, a nanoparticle, or a charged surfactant molecule or micelle.

In certain embodiments, the polycation or macrocation is selected from poly(diallyldimethyl ammonium), chitosan and poly(allylamine hydrochloride).

In certain embodiments, the polyanion or macroanion is selected from poly(styrene sulfonate), hyaluronic acid, poly (acrylic acid), poly(galacturonic acid) and alginate.

In certain embodiments, the salt is selected from NaCl, KCl, LiCl, NaBr, KBr, LiBr, NaI, KI, LiI, $Na_2SO_4$, $NaNO_3$, $CaCl_2$, $MgCl_2$, $MgSO_4$, ammonium formate, as well as transition metal salts, lanthanides, and actinides.

In certain embodiments, the polycation or macrocation comprises poly(diallyldimethyl ammonium), the polyanion or macroanion comprises poly(styrene sulfonate), and the salt comprises KBr.

In certain embodiments, the polycation or macrocation and polyanion or macroanion are substantially of equal length.

In certain embodiments, the polycation or macrocation and polyanion or macroanion are substantially of different lengths.

Additional examples of polyions or macroions are included in Table 1 and Table 2 below.

Besides the poly(styrene sulfonate) sodium salt and poly (diallyldimethylammonium) chloride system exemplified herein, a number of other polycations and polyanions can be made into printing inks and/or coatings via coacervation (Table 1 and Table 2).

TABLE 1

Summary of Cationic Macro-ions Examined via Rheological Characterization of Complex Coacervates

| Name | Strong/Weak | Type | References |
| --- | --- | --- | --- |
| α-Lactalbumin | Weak | Protein | 1, 2 |
| β-Lactoglobulin | Weak | Protein | 1-3 |
| Bovine Serum Albumin (BSA) | Weak | Protein | 1, 4-6 |
| Chitosan | Weak | Polysaccharide | 7, 8 |
| Gelatin | Weak | Protein | 1, 2, 9 |
| Gelatin A | Weak | Protein | 1-3, 8, 10-13 |
| Gelatin B | Weak | Protein | 1, 4-6, 13-16 |
| Jeffamine | Weak | Polymer | 7, 8, 17 |
| Lactoferrin | Weak | Protein | 18 |
| LAF-1 | Weak | Protein | 19 |
| mfp1 | Weak | Protein | 20 |
| mfp151 | Weak | Protein | 20 |
| O-carboxymethyl chitosan | Weak | Polysaccharide | 21 |

TABLE 1-continued

Summary of Cationic Macro-ions Examined via Rheological Characterization of Complex Coacervates

| Name | Strong/Weak | Type | References |
|---|---|---|---|
| Poly(allylamine hydrochloride) | Weak | Polymer | 22, 23 |
| Poly(diallyldimethyl-ammonium chloride) | Strong | Polymer | 5, 23-28 |
| Poly(ether) amine (Jeffamine) | Weak | Polymer | 17 |
| Poly(ethyleneimine) | Weak | Polymer | 23, 29 |
| Poly(N,N-dimethyl-aminoethyl methacrylate) | Weak | Polymer | 30, 31 |
| Wheat Protein | Weak | Protein | 11 |
| Whey Protein Isolate | Weak | Protein | 1, 2 |

TABLE 2

Summary of Anionic Macro-ions Examined via Rheological Characterization of Complex Coacervates

| Name | Strong/Weak | Type | References |
|---|---|---|---|
| Agar | Strong | Polysaccharide | 1, 14 |
| Alginate | Weak | Polysaccharide | 17, 32 |
| β-Lactoglobulin | Weak | Protein | 3, 15, 18 |
| DNA | Strong | Nucleic Acid | 10, 12 |
| Gelatin | Weak | Protein | 33 |
| Gelatin A | Weak | Protein | 8, 13 |
| Gelatin B | Weak | Protein | 13, 15, 16 |
| Gum Arabic | Weak | Polysaccharide | 2, 7, 21 |
| Hyaluronic Acid | Weak | Polysaccharide | 20 |
| κ-Carrageenan | Strong | Polysaccharide | 4 |
| Pectin | Weak | Polysaccharide | 3, 6 |
| Poly(acrylic acid) | Weak | Polymer | 23, 27, 30, 31 |
| Poly(aspartic acid) | Weak | Polypeptide | 20, 29 |
| Poly(glutamic acid) | Weak | Polypeptide | 29 |
| Poly(styrene sulfonate) | Strong | Polymer | 26, 28, 33 |
| Polyphosphate | Strong | Polymer | 34 |
| Pyrophosphate | Strong | Small Molecule | 22 |
| RNA | Strong | Nucleic Acid | 19 |
| Sodium Dodecylsulfate | Strong | Surfactant | 24, 25 |
| Sodium montmorillonite | Weak | Clay Particle | 9 |
| Soy Protein | Weak | Protein | 11, 32 |
| Tripolyphosphate | Strong | Small Molecule | 22 |
| Xantham gum | Weak | Polysaccharide | 32 |

(1) Rocha, et al. 2014 *Carbohydr. Polym.* 110, 345-353; (2) Weinbreck, et al. 2004 *J. Rheol.* 48, 1215-1228; (3) Wang, et al. 2007 *Biomacromolecules* 8, 992-997; (4) Chai, et al. 2011 *Advances in Colloid and Interface Science* 167, 24-37; (5) Kizilay, et al. 2011 *Advances in Colloid and Interface Science* 167, 24-37; (6) Ru, et al. 2012 *Carbohydr. Polym.* 88, 838-846; (7) Espinosa-Andrews, et al. 2013 *Carbohydr. Polym.* 95, 161-166; (8) Gupta, et al. 20071 *J. Phys. Chem. B* 111, 10137-10145; (9) Qazvini, et al. 2012 *Biomacromolecules* 13, 2136-2147; (10) Arfin, et al. 2014 *RSC Advances* 4, 11705-11713; (11) Firoozmand, et al. 2015 *Food Hydrocolloids* 50, 84-93; (12) Rawat, et al. 2012 *J. Phys. Chem. B* 116, 14805-14816; (13) Tiwari, et al. 2009 *Biomacromolecules* 10, 184-189; (14) Boral, et al. 2010 *J. Phys. Chem. B* 114, 12027-12035; (15) Pathak, et al. 2015 *RSC Advances* 5, 67066-67076; (16) Mohanty, et al. 2006 *J. Polym. Sci., Part B: Polym. Phys.* 44, 1653-1667; (17) Niang, et al. 2016 *Carbohydr. Polym.* 139, 67-74; (18) Kizilay, et al. 2014 *Soft Matter* 10, 7262-7268; (19) Elbaum-Garfinkle, et al. 2015 *Proc. Natl. Acad. Sci. U.S.A.* 201504822; (20) Ortony, et al. 2013 *Biomacromolecules* 14, 1395-1402; (21) Huang, et al. 2015 *Food Hydrocolloids* 43, 436-441; (22) Lawrence, et al. 2015 *Langmuir* 31, 1564-1574; (23) Priftis, et al. 2014 *Macromolecules* 47, 3076-3085; (24) Dubin, et al. 2008 *Langmuir* 24, 4544-4549; (25) Liberatore, et al. 2009 *Langmuir* 25, 13376-13383; (26) Schaaf, et al. 2015 *Adv. Mater.* 27, 2420-2432; (27) Tekaat, et al. 2015 *Phys. Chem. Chem. Phys.* 17, 22552-22556; (28) Wang, et al. 2014 *Macromolecules* 47, 3108-3116; (29) Priftis, et al. 2013 *J. Colloid Interface Sci.* 398, 39-50; (30) Spruijt, et al. 2013 *Macromolecules* 46, 1633-1641; (31) Spruijt, et al. 2010 *Phys. Rev. Lett.* 105, 208301; (32) Sánchez, et al. 1995 *Lebensm.-Wiss. Technol.* (1968-2004) 28, 380-385; (33) Hone, et al. 2000 *Macromolecules* 33, 1199-1205; (34) Momeni, et al. 2016 *J. Rheol.* 60, 25-34; (35) Perry, et al. 2014 *Polymers* 6, 1756-1772; (36) Schaaf, et al. 2015 *Adv. Mater.* 27, 2420-2432; (37) Wang, et al. 2014 *Macromolecules* 47, 3108-3116; (38) Kelly, et al. 2015 *ACS Appl. Mater. Interfaces* 7, 13980-13986; (39) Zhu, et al. 2016 *ACS Appl. Mater. Interfaces* 8, 31304-31310.

It is noted that although the specific example of PSS and PDADMAC was done using KBr as the salt, any suitable salts may be employed. These salts include, but are not limited to: NaCl, KCl, LiCl, NaBr, KBr, LiBr, NaI, KI, LiI, $Na_2SO_4$, $NaNO_3$, $CaCl_2$, $MgCl_2$, $MgSO_4$, ammonium formate, as well as transition metal salts, lanthanides, and actinides. A survey of the effects of some of these various salts on coacervation has been reported in the literature by Perry. (Perry, et al. 2014 *Polymers* 6, 1756-1772.)

In regard to suitable parameters for printing and/or coating, a number of factors may be explored for a given system to fine-tune the conditions for optimal performance. For example, in the exemplary system of PSS and PDADMAC, parameters that can be varied include polymer/salt concentrations, chain lengths of polyelectrolyte, salt and polymer types, pH, etc.

Additional parameters that can be modified or explored include:

| | |
|---|---|
| Surface wetting properties | Humidity |
| Substrate properties | Polymer/salt concentration |
| Dye/solids loading | Polymer charge stoichiometry |
| Coacervate flow properties | Polymer polydispersity |
| Print speed | Polymer molecular weight |
| Solution pH | Buffer strength |
| Solvent composition | |

EXAMPLES

Figure 2:
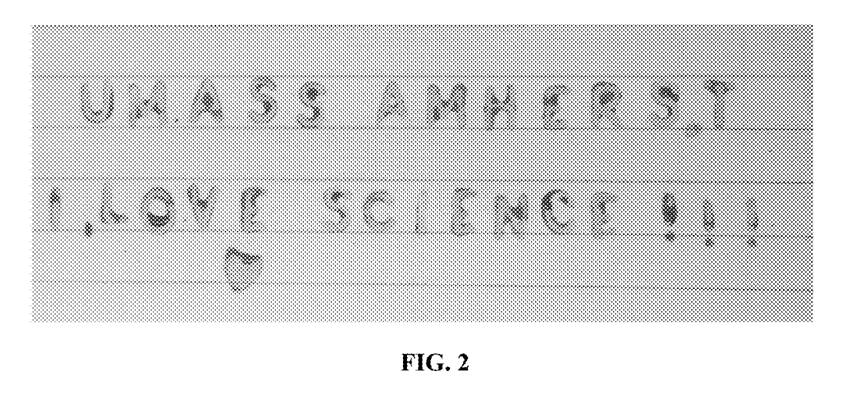
FIG. 2. Example of stamping complex coacervates loaded with blue dye onto paper.

A system of poly(styrene sulfonate) sodium salt and poly(diallyldimethylammonium) chloride were studied with a range of salt concentrations (1.2M-2.0M KBr). FTIR, EDS and SEM characterizations as well as stability analysis in various buffers and organic solvents were also performed. FIGS. 1-2 depict exemplary experimental conditions and characterization data.

To prepare coacervates, the salt solution is mixed first with either the polyanionic solution or the polycationic solution, and then the mixture is mixed with the remaining polycationic solution or polyanionic solution. It is important that the salt gets in the mixture first, because once the two oppositely charged polymers combine, it takes a long time for salt to enter the complex.

As exemplified in FIG. 1, the coacervate-based coating or printing process starting with a model system of poly(4-styrene sulfonate sodium salt) (PSS), poly(diallyldimethylammonium chloride) (PDADMAC), and potassium bromide (KBr). Coacervate is in a container to be dipped by a patterned printing stamp/roll. The coacervate ink is then transferred from the stamp to a printable substrate. The processing only uses water and salt. No organic solvents or crosslinkers are required.

FIG. 2 shows an exemplary print on a paper substrate wherein the complex coacervates had been loaded with blue dye.

Coacervates were formed from commercial grade poly(4-styrene sulfonate sodium salt) (PSS) and poly(diallyldimethylammonium chloride) (PDADMAC), salt, and water. No crosslinkers or other stabilizing agents were added. To make the dye loaded coacervate, individual PSS and PDADMAC stock solutions were prepared gravimetrically at a concentration of 0.5 M based on their monomer units, and adjusted to pH 7.2 with a few drops of concentrated HCl or NaOH solutions. KBr stock solution was prepared at a concentration of 4 M. Complex coacervates were prepared by mixing the KBr solution with water in a centrifuge tube (50 mL, Fisher Scientific), followed by sequential addition of PSS, solid Brilliant Blue G pigment (>85%, Sigma-Aldrich), and PDADMAC. The total pigment concentration in the centrifuge tube is 1 mg/mL, the total KBr concentration is 1.70 M, and the PSS/PDADMAC is in a 1:1 molar ratio at a total concentration of 0.1 M, on a monomer basis. The mixture was vortexed for 15 s after each solution addition. After the addition of Brilliant Blue G solids, the mixture was rotated for >4 hours at 20 RPM to ensure complete dissolution of the dye and homogeneity of the solution. After the addition of PDADMAC solution, the sample was hand shaken for 30 seconds and then rotated to mix overnight. Samples were then centrifuged (Sorvall ST 16R Centrifuge, Thermo Fisher Scientific) at 3500 rpm for 10 min to facilitate coalescence of the dense coacervate phase. This dense phase was then transferred out to a separate clean plastic petri dish (Fisher Scientific) and stamped onto paper using a set of commercially purchased letter rubber stamp.

Polyelectrolytes and macroions can be classified into various categories. Polyelectrolytes may be natural or synthetic. Polyelectrolytes may be natural and chemically modified biopolymers. Polyelectrolytes may be based on homopolymers and copolymers. Polyelectrolytes can be linear, branched or crosslinked.

A range of dyes (e.g., food dye, Brilliant Blue G and R, Fast Green FCF, Rhodamine 6G, B, and 123, FITC) and materials (e.g., proteins, essential oils, florescent dyes, pigment particles, solid nanoparticles, pharmaceuticals) can be loaded into the coacervates and as components of the ink.

Additionally, it was found that solid polyelectrolyte complexes prepared using the same precursor coacervates are resistant to pH changes and a wide range of organic solvents (e.g., acetone, chloroform, dichloromethane, dimethylformamide, dimethyl sulfoxide, ethanol, ethyl acetate, hexane, methanol, 2,2,2-trifluoroethanol, tetrahydrofuran, and toluene). Furthermore, thermogravimetric analysis (TGA) suggests that the complexes are stable up to 450° C. Thus, the printed coacervate materials are robust when exposed to solvents and at elevated temperatures.

Figure 3:
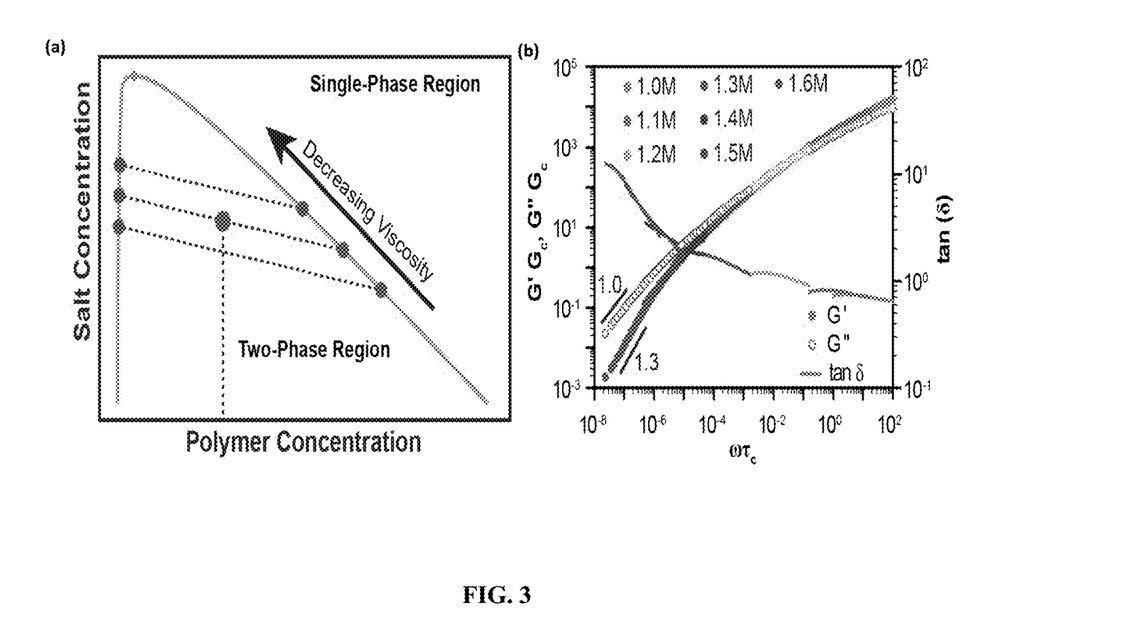
FIG. 3. (a) Schematic thermodynamic phase diagram for complex coacervation. The phase boundary separates the two-phase region of coacervation (beneath the curve) from the single-phase solution region (above the curve). The blue circle represents a sample that will phase separate along dashed tie-lines to form a polymer-rich coacervate phase and a polymer-poor supernatant phase. Viscosity decreases with increasing salt concentration and decreasing polymer concentration. (b) Time-salt superposition curves showing the scaled frequency dependence of the storage and loss moduli for coacervates at different salt concentrations.

FIG. 3a shows schematic thermodynamic phase diagram for complex coacervation. The phase boundary separates the two-phase region of coacervation (beneath the curve) from the single-phase solution region (above the curve). The blue circle represents a sample that will phase separate along dashed tie lines to form a polymer-rich coacervate phase and a polymer-poor supernatant phase. As it can be seen, viscosity decreases with increasing salt concentration and decreasing polymer concentration.

FIG. 3b shows time-salt superposition curves illustrating the scaled frequency dependence of the storage and loss moduli for coacervates at different salt concentrations.

The successful development of coacervate-based inks requires a combination of these fundamental characterization efforts of the thermodynamic phase behavior and rheological characteristics of the candidate materials.

Figure 4:
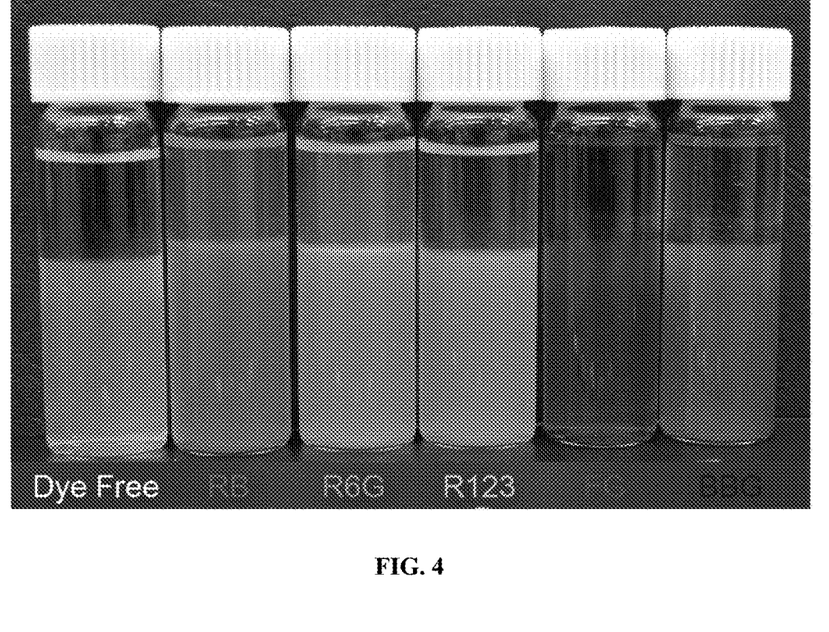
FIG. 4. A photograph of the aqueous complex coacervates without and with loaded dyes. Dye-free complex coacervates composed of poly(4-styrenesulfonic acid, sodium salt) (PSS) and poly(diallyldimethyl ammonium chloride) (PDADMAC) in aqueous potassium bromide (KBr) alongside coacervates containing the dyes brilliant blue G (BBG), fast green FCF (FG), fluorescein sodium salt (FS), rhodamine 123 (R123), rhodamine 6G (R6G), and rhodamine B (RB), respectively. The dense, polymer- and dye-rich complex coacervate phase is in equilibrium with the polymer- and dye-poor supernatant.

A photograph of the aqueous complex coacervates without and with loaded dyes is shown in FIG. 4. The dye-free complex coacervates were composed of poly(4-styrenesulfonic acid, sodium salt) (PSS) and poly(diallyldimethyl ammonium chloride) (PDADMAC) in aqueous potassium bromide (KBr). Alongside were coacervates having the dyes brilliant blue G (BBG), fast green FCF (FG), fluorescein sodium salt (FS), rhodamine 123 (R123), rhodamine 6G (R6G), and rhodamine B (RB), respectively. The dense, polymer- and dye-rich complex coacervate phase was in equilibrium with the polymer- and dye-poor supernatant.

Figure 5:
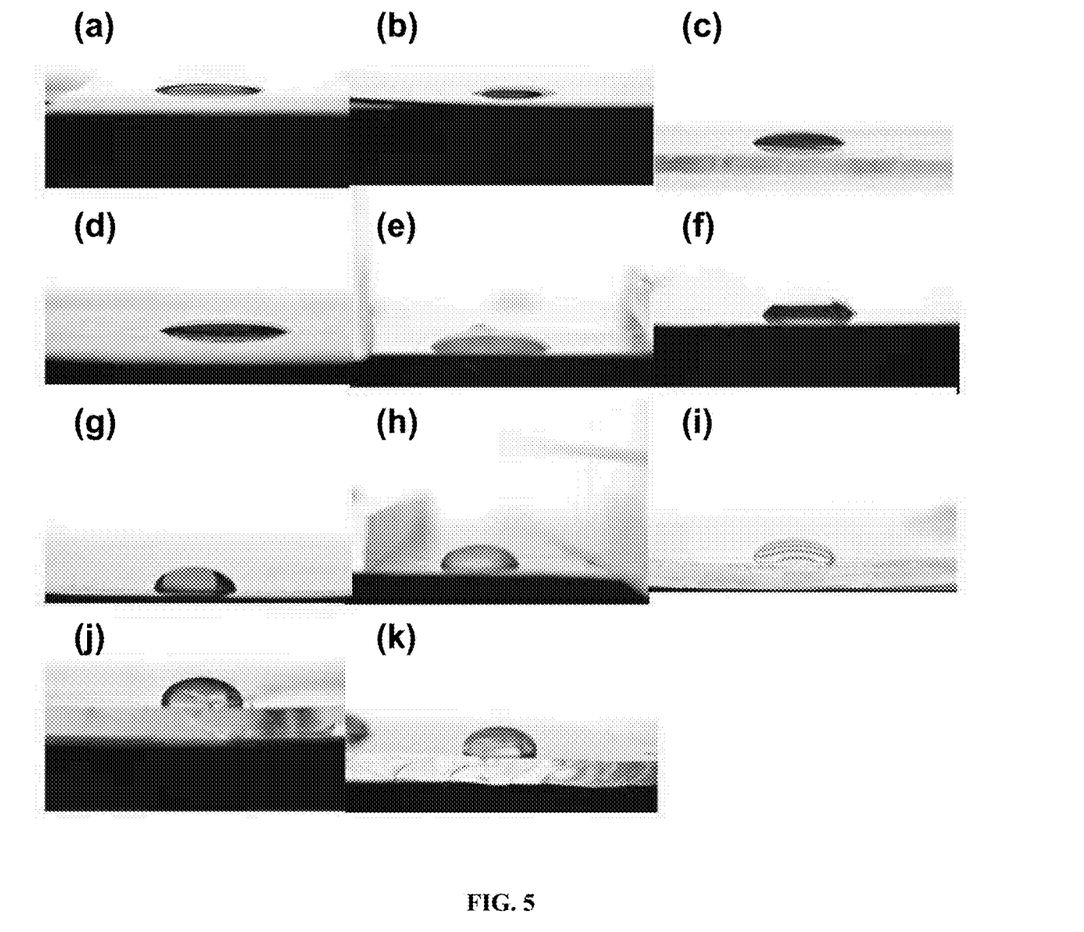
FIG. 5. Photographs showing coacervate-based ink wetting different surfaces. The images are ordered in terms of increasing contact angle (decreasing wettability). The surfaces being tested in the images are (a) a glass slide, (b) a silicon wafer, (c) acrylic glass, (d) layer-by-layer applied polyelectrolyte complex, (e) a hydrophilic film, (f) a hydrophobic film, (g) a layer-by-layer assembled polyelectrolyte complex of PDADMAC-PSS (h) Parafilm, (i) UV-ozone treated hydrophilic PDMS, (j) untreated PDMS, and (k) silane treated PDMS.

Photographs in FIG. 5 show coacervate-based ink wetting different surfaces. The images were ordered in terms of increasing contact angle (decreasing wettability). The surfaces being tested in the above images were (a) a glass slide, (b) a silicon wafer, (c) acrylic glass, (d) layer-by-layer applied polyelectrolyte complex, (e) a hydrophilic film, (f) a hydrophobic film, (g) a layer-by-layer assembled polyelectrolyte complex of PDADMAC-PSS (h) Parafilm, (i) UV-ozone treated hydrophilic PDMS, (j) untreated PDMS, and (k) silane treated PDMS.

Figure 6:
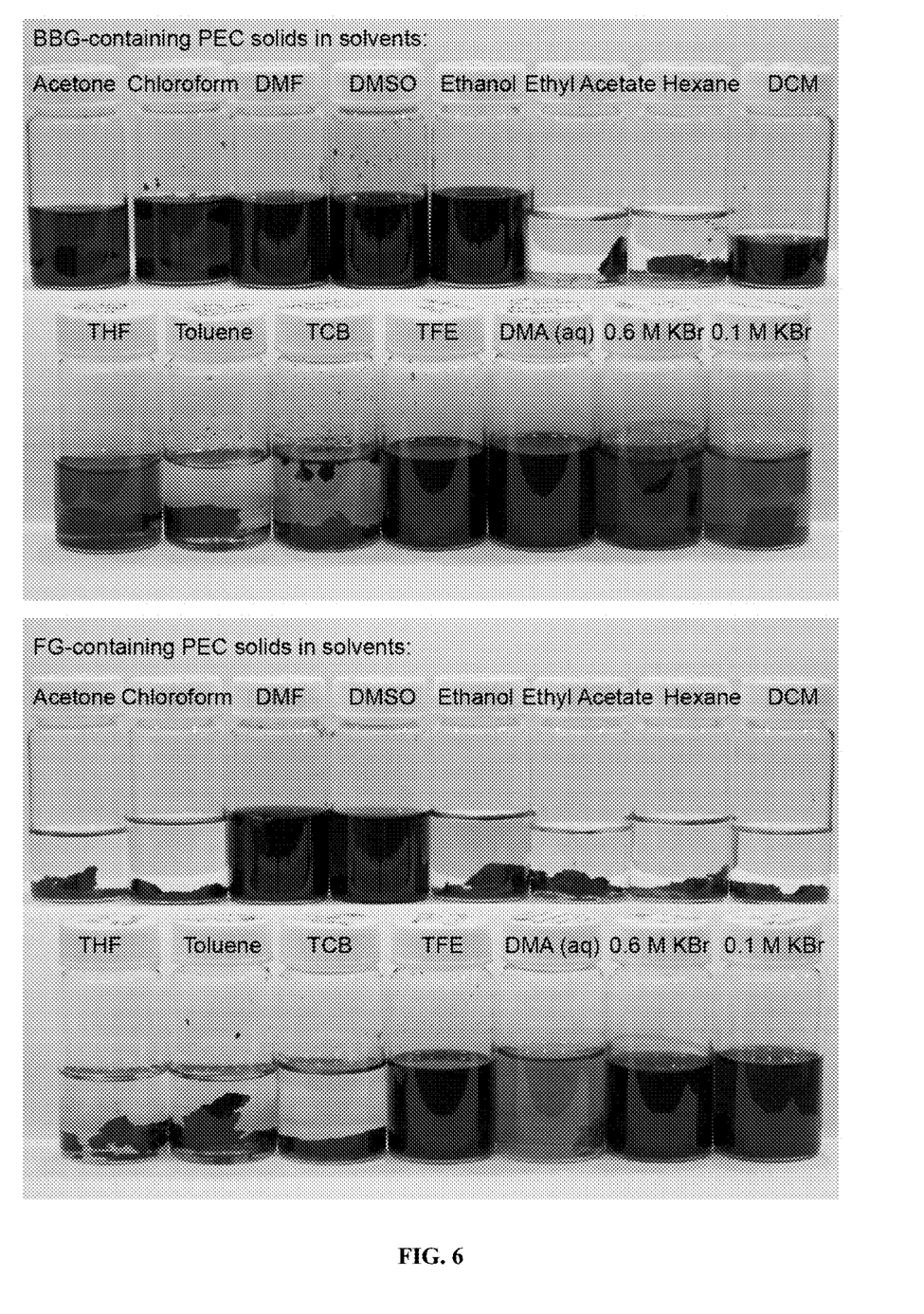
FIG. 6. Photograph of 0.2 g freeze dried BBG- and FG-containing coacervate in submerged in 10 mL of acetone, chloroform, dimethylformamide (DMF), methyl sulfoxide (DMSO), ethanol, ethyl acetate, hexane, dichloromethane (DCM), tetrahydrofuran (THF), toluene, 1,2,4-triclorobenzene (TCB), 2,2,2-trifluoroethanol (TFE), 40% dimethyl ammonium (DMA) in water, 0.6 M and 0.1 M KBr aqueous solutions. Coacervate solids were prepared by lyophilizing coacervate made from 0.5 M PSS/PDADMAC in 1.6 M KBr with total of 15 mM BBG and FG, respectively. Coacervate solids are stable in all solvents tested. Leaching of dye materials is a function of the dye and the solvent combination.

The photograph shown in FIG. 6 was from 0.2 g freeze dried BBG- and FG-containing coacervate in submerged in 10 mL of acetone, chloroform, dimethylformamide (DMF), methyl sulfoxide (DMSO), ethanol, ethyl acetate, hexane, dichloromethane (DCM), tetrahydrofuran (THF), toluene, 1,2,4-triclorobenzene (TCB), 2,2,2-trifluoroethanol (TFE), 40% dimethyl ammonium (DMA) in water, 0.6 M and 0.1 M KBr aqueous solutions. Coacervate solids were prepared by lyophilizing coacervate made from 0.5 M PSS/PDADMAC in 1.6 M KBr with total of 15 mM BBG and FG, respectively. Coacervate solids were stable in all solvents tested. Leaching of dye materials was found to be a function of the dye and the solvent combination.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A method for forming a coating on a substrate, comprising:
   providing an aqueous coacervate suspension comprising a polyanion or macroanion, a polycation or macrocation, and a salt;
   coalescing the aqueous coacervate suspension into a homogeneous coacervate phase; and
   depositing the coacervate phase on a substrate to form a coating on the substrate, wherein the polycation or macrocation comprises poly(diallyldimethyl ammonium), the polyanion or macroanion comprises poly(styrene sulfonate), and the salt comprises KBr.

2. The method of claim 1, wherein the aqueous coacervate suspension comprises no organic solvent or co-solvent.

3. The method of claim 1, wherein the aqueous coacervate suspension comprises no crosslinking agent.

4. The method of claim 1, wherein the stoichiometry of polyanion or macroanion to polycation or macrocation in the aqueous coacervate suspension is from about 0.25 to about 0.75.

5. The method of claim 1, wherein the substrate is conventional paper or cardboard.

6. The method of claim 1, wherein the substrate is a plastic, fabric, metallic or inorganic material.

7. The method of claim 1, wherein polycation or macrocation and polyanion or macroanion are of substantially equal length.

8. The method of claim 1, wherein polycation or macrocation and polyanion or macroanion are of substantially different length.

9. A coating formed by the method of claim 1.

10. The coating of claim 9, having a substantially uniform thickness.

11. The coating of claim 10, wherein the substantially uniform thickness is in the range from 5 nm to about 500 of µm.

12. A method for printing from an aqueous coacervate composition, comprising:
    providing an aqueous coacervate suspension comprising a polyanion or macroanion, a polycation or macrocation, and a salt;
    coalescing the aqueous coacervate suspension into a homogeneous coacervate phase; and
    depositing the coacervate phase on a substrate to form a print on the substrate, wherein the stoichiometry of polyanion or macroanion to polycation or macrocation in the aqueous coacervate suspension is from about 0.25 to about 0.75.

13. A print formed by the method of claim 12.

14. An aqueous ink, comprising a polyanion or macroanion, a polycation or macrocation, and a salt, wherein the polycation or macrocation comprises poly(diallyldimethyl ammonium), the polyanion or macroanion comprises poly(styrene sulfonate), and the salt comprises KBr.

15. The method of claim 12, wherein the aqueous coacervate suspension comprises no organic solvent or co-solvent and no crosslinking agent.

16. The method of claim 12, wherein the substrate is conventional paper or cardboard.

17. The method of claim 12, wherein the substrate is a plastic, fabric, metallic or inorganic material.

18. The method of claim 12, wherein the polycation or macrocation is selected from poly(diallyldimethyl ammonium), chitosan and poly(allylamine hydrochloride) and the polyanion or macroanion is selected from poly(styrene sulfonate), hyaluronic acid, poly(acrylic acid), poly(galacturonic acid) and alginate.

19. The method of claim 12, wherein the salt is selected from NaCl, KCl, LiCl, NaBr, KBr, LiBr, NaI, KI, LiI, $Na_2SO_4$, $NaNO_3$, $CaCl_2$, $MgCl_2$, $MgSO_4$, ammonium formate, as well as transition metal salts, lanthanides, and actinides.

20. The method of claim 12, wherein the polycation or macrocation comprises poly(diallyldimethyl ammonium), the polyanion or macroanion comprises poly(styrene sulfonate), and the salt comprises KBr.

* * * * *